United States Patent [19]

Hsu et al.

[11] Patent Number: 5,387,425
[45] Date of Patent: Feb. 7, 1995

[54] METHOD AND COMPOSITION FOR ENHANCING FOAM PROPERTIES OF FERMENTED MALT BEVERAGES

[75] Inventors: Wen P. Hsu; Timothy W. Foley, both of Chicago; Helga J. Haller, Lincolnwood, all of Ill.

[73] Assignee: Rhone-Poulenc Specialty Chemicals Co., Cranbury, N.J.

[21] Appl. No.: 106,421

[22] Filed: Aug. 13, 1993

Related U.S. Application Data

[63] Continuation of Ser. No. 829,906, Feb. 3, 1992, abandoned.

[51] Int. Cl.$^6$ ................................................ C12C 5/02
[52] U.S. Cl. ................... 426/329; 426/330.4; 426/592; 426/600
[58] Field of Search ............... 426/592, 16, 329, 600, 426/330.4

[56] References Cited

U.S. PATENT DOCUMENTS

| | | |
|---|---|---|
| 2,478,988 | 8/1949 | Wallerstein et al. |
| 2,659,675 | 11/1953 | Steiner . |
| 3,051,574 | 8/1962 | Segel . |
| 3,099,563 | 7/1963 | Smith . |
| 3,223,529 | 12/1965 | Stone . |
| 3,266,902 | 8/1966 | Brenner . |
| 3,526,510 | 12/1967 | Raymond et al. |
| 3,573,928 | 4/1971 | Marotta et al. |
| 3,966,976 | 6/1976 | Schuppner, Jr. et al. |
| 5,190,778 | 3/1993 | Clare et al. |

FOREIGN PATENT DOCUMENTS

| | | |
|---|---|---|
| 681013 | 2/1964 | Canada . |
| 681536 | 3/1964 | Canada . |
| 2148322A | 5/1986 | United Kingdom . |

OTHER PUBLICATIONS

Anderson et al., "Nitrogenous Constituents of Brewing Materials XII. Foam–Stabilizing Substances in Beer," *J. Inst. Brewing* 69:383–388 (1963).
Archibald et al., "Observations on Factors Affecting Beer Foam Characteristics," *Proc. EBC Congress* 349–362 (1975).
Asano et al., "Contribution of Hop Bitter Substances to Head Formation of Beer," *Rep. Res. Lab. Kirin Brewery Co., Ltd.* 19:9–16 (1976).
Asano et al., "Isolation and Characterization of Foaming Proteins in Beer," *ASBC Journal* 38:129–136 (1980).
Asano et al., "Characterization of Haze–Forming Proteins of Beer and Their Roles in Chill Haze Formation," *ASBC Journal* 40:147–154 (1982).
Aubert et al., "Aqueous Foams," *Scientific American* 254:74–82 (1986).
Baker, "Impact of Post–Filtration Addition of Selected Hop Extracts on Beer Foam and Clarity," *MBAA Technical Quarterly* 27:33–38 (1990).
Bamforth et al., "Aspects of Foam Lacing," *Proc. EBC Congress* 331–338 (1983).

(List continued on next page.)

*Primary Examiner*—Carolyn Paden
*Attorney, Agent, or Firm*—Willian Brinks Hofer Gilson & Lione

[57] ABSTRACT

There is disclosed a method and composition for enhancing the foam properties of a fermented malt beverage. Briefly stated, the method comprises adding to the beverage an isohumulone extract in the amount of between about 0.1 ppm and about 20 ppm by weight of the beverage and foaming proteins in the amount of between about 2 ppm and about 250 ppm by weight of the beverage. The fermented malt beverage foam-enhancing composition comprises a mixture of isohumulone extract and foaming proteins, wherein the ratio of isohumulone extract to foaming proteins is between about 1 to about 1 and about 1 to about 2500. Further disclosed is a beverage composition with enhanced foam properties which comprises (a) a fermented malt beverage, (b) an isohumulone extract, the extract comprising between about 0.1 ppm and about 20 ppm by weight of the fermented malt beverage; and (c) foaming proteins, the proteins comprising between about 2 ppm and about 250 ppm by weight of the fermented malt beverage.

41 Claims, No Drawings

OTHER PUBLICATIONS

Banforth et al., "Original Approaches to Improving the Foam of Beer," *Proc. EBC Congress* 515–522 (1985).

Bamforth et al., "Egg Albumen as a Source of Foam Polypeptide in Beer," *ASBC Journal* 45:27–32 (1987).

Bishop et al., "A Scientific Basis for Beer Foam Formation and Cling," *J. Inst. Brewing* 80:68–80 (1974).

Bishop, "Haze- and Foam-Forming Substances in Beer," *J. Inst. Brewing* 81:444–449 (1975).

Clark et al., "The Effect of Pre-Isomerised Hop Extract on the Properties of Model Protein Stabilized Foams," *J. Inst. Brewing* 97:169–172 (1991).

Comrie, "The Production of Foam on Beer," *Brewers Digest* 23:42–45 (1959).

Cook, "Factors in Head Retention," *Proc. EBC Congress* 469–478 (1971).

Dale et al., "Rapid Methods for Determining the High Molecular Weight Polypeptide Components of Beer," *J. Inst. Brewing* 93:465–467 (1987).

Davies et al., "Nitrogenous Constituents of Brewing Materials VIII. Fractionation of the Nitrogen Compounds of Worts and Beers. Foam–Stabilizing Activity of the Fractions," *J. Inst. Brewing* 62:239–250 (1956).

Diffor, "The Effect of Isohumulone/Isocohumlone Ratio on Beer Head Retention," *ASBC Journal* 36:63–65 (1978).

Fly, "The Effect of Countercurrent Distribution Fractions of Hop Extracts on Beer Foam," *ASBC Journal* 35:69–72 (1976).

Hollemans et al., "The Role of Specific Proteins in Beer Foam," *Proc. EBC Congress* 561–568 (1987).

Jackson et al., "Melanoidins and Beer Foam," *Proc. ASBC* 36:192–195 (1978).

Jackson et al., "Mechanism of Beer Foam Stabilization by Propylene Glycol Alginate," *J. Inst. Brewing* 86:34–37 (1980).

Klopper, "Foam Stability and Foam Cling," *Proc. EBC Congress* 363–371 (1973).

Krauss, "Problems of Foam Stability," *Brewers Digent* XLV:66–75 (1970).

Leeson et al., "Biochemical and Physical Analysis of Beers—Roles for Macromolecular Species in Foam Stabilization at Dispense," *Royal Soc. Chem.* 82:194–206 (1991).

Lusk et al., "A Surface-Active Fraction Isolated From Beer," *ASBC Journal* 45:91–95 (1987).

Luykx, "Influence of Metal Ions on Beer Properties, with Special Reference to Foam," *J. Inst. Brewing* 66:399–407 (1960).

Lyons, "Beer Foam and Head Retention," *Brewers Digest* LIX:22–24 (1984).

Morris et al., "Enhancement of Foam Stability by Increased Utilization of Polypeptides," *Proc. EBC Congress* 561–568 (1987).

NarziB et al., "Latest Findings on Beer Foam," *Brauwelt International* II:126–134 (1990).

Nissen, "Composition of Beer Foam," *Proc. ASBC* 23–29 (1940).

Ohata et al., "Studies on Foam Stability of Beer," *Proc. EBC Congress* 569–576 (1987).

Pierce, "The Role of Positive and Negative Factors in Head Retention," *J. Inst. Brewing* (Australia and New Zealand Section) 15:51–65 (1978).

Roberts, "Glycoproteins and Beer Foam," *Proc. EBC Congress* 453–464 (1975).

Roberts, "Colloidal Aspects of Beer Foam," *Brewers Digest* 52:50–58 (1977).

Roberts et al., "The Effects of Lipids and Related Materials on Beer Foam," *J. Inst. Brewing* 84:9–12 (1978).

Scheer, "Effects of High Protein Malts on Finished Beers," *MBAA Technical Quarterly* 27:73–75 (1990).

Schulze et al., "Gel Chromatography and Isoelectric-focusing of Beer Foam Protein Fractions" *ASBC Journal* 4:181–186 (1976).

Segel et al., "Beer Foam," *MBAA Technical Quarterly* 4:104–112 (1967).

Siebert et al., "The Relationship of Beer High Molecular Weight Protein And Foam," *MBAA Technical Quarterly* 26:139–146 (1989).

Slack et al., "The Fractionation of Polypeptides from Barley and Beer by Hydrophobic Interaction Chromatography: The Influence of Their Hydrophobicity on Foam Stability," *J. Inst. Brewing* 89:397–401 (1983).

Todd et al., "Evaluation of the Relative Bitterness and Light Stability of Reduced Iso-Alpha Acids," *MBAA Technical Quarterly* vol. 9, No. 1, pp. 31–35 (1972).

Vancraenenbroeck et al., "Considerations on Foam—Active Complexes in Beer," *Proc. EBC Congress* 323–330 (1983).

(List continued on next page.)

OTHER PUBLICATIONS

Wenn, "'Foam-Loving' Complex Nitrogen Materials in Beer," *J. Inst. Brewing* 78:404–406 (1972).

Whitear, "Basic Factors That Determine Foam Stability," *J. Inst. Brewing* (Australia and New Zealand Section) 15:67–78 (1978).

Yokoi et al., "Characterization of Major Proteins and Peptides in Beer," *ASBC Journal* 46:99–103 (1988).

Yokoi et al., "Characterization of Beer Proteins Responsible for the Foam of Beer," *Proc. EBC Congress* 593–600 (1989).

Bamforth, "The Foaming Properties of Beer," *J. Inst. Brewing* 91:370–83 (1985).

Coghlan et al., "Polypeptides with Enhanced Foam Potential," *J. Inst. Brewing* 98(3) 207–13 (1992).

Dale et al., "Low Molecular Weight Nitrogenous Components and Their Influence on the Stability of Beer Foam," *J. Inst. Brewing*, 98:123–27 (1992).

Dale, "Beer Polypeptides," *Ferment* 4:217–20 (1990).

Gardner, "Surface Viscosity and Gushing," *J. Inst. Brewing* 78:391–98 (1972).

Heintz, "Aspects of Beer Foam Foundation and Head Retention," *MBAA Technical Quarterly* 24:58–60 (1987).

Hollemans et al., "The Role of Malt Lipids in Beer Foam," *MBAA Technical Quarterly* 28:168–73 (1991).

Huston et al., "The Protein Character of Beer is Defined in the Brewhouse," *ASBC Journal* 44(1):40–44 (1986).

Maeda et al., "Foam Stability and Physicochemical Properties of Beer," *ASBC Journal* 49:14–18 (1991).

Ormrod, "The Release of Yeast Proteolytic Enzymes Into Beer," *J. Inst. Brewing* 97:441–43 (1991).

Outtrup, "Foam Stabilizers May Contribute to Beer Haze," *Proc. EBC Congress* 473–80 (1991).

Prins et al., "Proteins and Surface Effects in Fermentation: Foam, Antifoam and Mass Transfer," *Trends in Biotechnology*, vol. 5, No. 11, pp. 296–301 (1987).

Sharpe et al., "Rapid Methods of Measuring the Foam-active Nitrogenous Components of Worts and Beers," *Proc. EBC Congress* 607–14 (1981).

Vancraenenbroeck et al., "Foaming Power of Malt Proteins," *Proc. EBC Congress* 499–506 (1985).

Voigt et al., "Some Technological Factors Affecting Beer Foam," *Proc. EBC Congress* 681–88 (1991).

Wackerbauer et al., "Hop Bitter Compounds in Beer," *Brauwelt International*, II/1992 144–48 (1992).

METHOD AND COMPOSITION FOR ENHANCING FOAM PROPERTIES OF FERMENTED MALT BEVERAGES

This is a continuation of application Ser. No. 07/829,906, filed Feb. 3, 1992, now abandoned.

FIELD OF THE INVENTION

The present invention relates to a method and composition which enhances the foam properties of malt beverages. More particularly, the present invention relates to enhancing the amount and persistence of the foam head on a fermented malt beverage.

As used herein, the term "malt beverages" includes such foam-forming, fermented malt beverages as beer, ale, dry beer, near beer, light beer, low alcohol beer, low calorie beer, porter, bock beer, stout, malt liquor, non-alcoholic malt beverages and the like. Unless otherwise noted, the term "beer" shall be used throughout this specification as a generic term and refers to the entire group of fermented malt beverages.

Background of the Invention

The process of making fermented malt beverages is commonly referred to as brewing. Generally, the principal raw materials used in making these beverages are water, hops and malt. In addition, adjuncts such as common corn grits, refined corn grits, and brewer's (milled) rice may be used as sources of starch. The starch will eventually be converted into dextrins and fermentable sugars.

For a number of reasons, the malt, which is produced principally from selected varieties of barley typically has the greatest effect on the overall character and quality of the beer. First, the malt is the primary flavoring agent in beer. Second, the malt provides the major portion of the fermentable sugars. Third, the malt provides the proteins which will contribute to the body and foam character of the beer. Fourth, the malt will provide the necessary enzymatic activity during mashing.

Hops also contribute significantly to beer quality, including flavoring. In particular, hops (or hop constituents) add desirable bittering substances to the beer. In addition, the hops act as protein precipitants, establish preservative agents, and aid in foam formation and stabilization.

MASHING

The brewing process begins by mixing ground malt and warm water in large tubs until it forms a malt mash of porridge-like consistency. The temperature of the mash is then raised in steps, with time allowed at each step for the various enzymes to convert the starches into fermentable sugars.

If rice and corn adjuncts are to be used, they are separately cooked and a cooker mash is obtained. Production of the cooker mash involves the use of adjuncts along with a 10% to 30% portion of the malt (or the addition of commercial enzymes) in order to convert raw starch into fermentable sugars. The adjuncts (and the malt portion) are gradually brought to boiling and held there until the products are completely gelatinized. During the final stages of mashing (at the higher temperatures), the cooker mash and the malt mash are combined.

Mashing serves a three-fold purpose. First, it brings into solution those substances of malt (and adjuncts) which are readily soluble in warm water. Second, it permits malt enzymes to act on insoluble substances and render them soluble. Third, it provides a far-reaching enzymatic degradation of starches, proteins and gums into products of smaller size and lower molecular weight.

LAUTERING AND SPARGING

Lautering consists of the removal of the liquid, now termed wort, from the insoluble husks or "spent grains." Lautering begins upon termination of the mashing process, whereby the finished mash is transferred to a lautering tub. There, it is allowed to rest for about ten to thirty minutes during which time the spent grains settle to the bottom. The lautering tub is equipped with a false bottom containing numerous perforations and an outlet leading to the true bottom of the tub. The wort is drawn off and circulated through the grains until a clear product is obtained. The clear wort is then pumped into a brewing kettle. Hot water is run through the spent grains to rinse out, or sparge, any remaining wort.

BOILING AND HOPPING OF WORT

The wort is boiled vigorously for one to two and one-half hours in the brew kettle. In addition, hops may be added at various stages of the boiling process, depending on the nature of the final product that is sought.

Wort boiling serves a number of objectives, including (1) concentration of the sparged wort, (2) complete inactivation of enzymes that may have survived the final mashing process, (3) coagulation and precipitation of high-molecular weight proteins and solids (termed "kettle break" or "hot break"), (4) extraction of desirable hop constituents, and (5) sterilization of the wort.

COOLING, FERMENTATION AND STORAGE

After boiling, the wort is strained to remove the solids, or "trub." Next, the wort is cooled generally to a temperature of about 47° F.

Fermentation is started when the wort is pitched with the proper amount of a pure yeast culture. After 24 hours, fermentation is established and proceeds at an accelerated rate. Fermentation continues for usually about 7 to 10 days. During this period, the wort temperature must be controlled, since the fermentation process causes the temperature of the wort to rise. Once the yeast has metabolized all the fermentable ingredients in the wort, it settles to the bottom and is subsequently recovered for use in pitching other brews. As the fermentation process comes to a conclusion, the temperature of the wort begins to drop. The fermented wort (termed "green beer") is drawn off for storage in a tank, or "ruh." There, its temperature is lowered to about 36° F.

MATURATION, PROCESSING AND PACKAGING

The "ruh" beer may be allowed to remain in the "ruh" tank for completion of the maturation process, or it may be transferred into a separate maturation tank upon further settling of any remaining yeast and other solids. Depending on the particular brewery, the beer is allowed to age from about 14 days to about 3 months. During this period, the beer clarifies and its flavor develops. Upon maturation, the beer generally undergoes filtration and pasteurization.

The beer can undergo a single or a double pass filtration process. The double pass filtration consists of two steps, a primary (coarse) filtration and a polish (fine) filtration. In the case of the cold-filtered "draft" beers, a microfiltration system is used to remove any possible contaminants, thereby avoiding the need for pasteurization. Filtered beer is subsequently stored in a finishing tank.

To prepare the beer for consumption, it is carbonated to a specified level. Then, depending on the form of packaging, the beer is pasteurized. Beer packaged in cans and bottles is usually pasteurized, while beer packaged in kegs (and sometimes bottles) remains unpasteurized. After final processing of the packaged product (e.g. labeling, etc.), the beer is ready for shipping to the consumer.

THE ATTRIBUTES OF FERMENTED MALT BEVERAGES

Malt beverages, especially beer, possess attributes readily discernable by the consumer. These attributes include foam, flavor and clarity. Of these, foam is probably paramount, as consumers are continually subjected to the sight of a foamy glass or stein of beer through the advertising media. Also, foam is typically the first attribute they become aware of as beer is poured or drawn. A number of beers will produce a relatively good foam immediately after pouring, but the foams so produced may not be as persistent as is usually desired by consumers. For example, a loose, large-bubbled foam may tend to settle quickly without showing any of the desirable characteristics generally associated with a good beer foam.

The formation of a good so-called "head" of foam when beer is poured into a glass is considered by many to be a visual gauge of beer quality. A fine, creamy stable foam has a definite psychological appeal to many consumers. Consequently, a number of consumers desire a product that, when poured into a glass, will form a stable head that will persist until the beer is consumed. In addition, it is desirable that the beer foam cling to the vessel as it slides down the glass surface, leaving behind an adherent curtain of foam, sometimes referred to as "dace" or "lacing of the glass."

In addition, an increasing number of consumers desire an all-natural beer product which demonstrates the above qualities yet is entirely free of artificial additives or supplements.

Suffice it to say that a great many brewmasters seek to improve the foam qualities of their beers. As such, it has long been the practice of brewers to attempt to improve the beer foam through the use of additives.

For example, U.S. Pat. No. 2,478,988 discloses the addition of propylene glycol alginate (PGA) to the beverage to increase the duration and persistence of the foam. Concerning this particular additive, Jackson, et al., "Mechanism of Beer Foam Stabilization by Propylene Glycol Alginate," *J. Inst. Brew.* 86:34 (1980) suggest that the foam stabilizing action of PGA results from the electrostatic interaction between carboxyl groups on the glycol alginate molecules and the peptide amino groups found at the foam bubble walls.

U.S. Pat. No. 3,223,529 discloses the addition of a mixture of PGA and a water-soluble zinc salt to improve the foam characteristics of beer.

U.S. Pat. No. 3,266,902 discloses the addition of zinc and manganese salts to PGA to provide a distinct improvement in foam qualities, including an increase in the tendency of the foam to "lace" on the glass wall.

U.S. Pat. No. 3,526,510 discloses the use in certain chemically pasteurized beers of a compound as a "foam stabilizer" and "curtain former. This compound is selected from the group consisting of sodium dioctyl sulfosuccinate, sodium dihexyl sulfosuccinate, sodium diamyl sulfosuccinate, disodium N-octadecyl-sulfosuccinamate and tetrasodium N-(1,2-dicarboxyethyl)-N-octadecyl-sulfo-succinamate.

U.S. Pat. No. 3,966,976 discloses a process for preparing malt beverages having good foam stability and improved lace and cling through the addition of a polysaccharide colloid S-10.

Notably, each of the above methods or compositions for the improvement of foam quality, with the exception of the polysaccharide colloid S-10, involved the use of additives not naturally found in beer.

It has also been known that certain compounds found naturally in beer can contribute to good foam quality. For example, these foam positive materials generally include iso-alpha acids such as isohumulone and reduced isohumulone; partially hydrolyzed proteins; carbohydrates; ethanol; air; nitrogen; carbon dioxide; and some metal ions. See Bishop, et at., "A Scientific Basis for Beer Foam Formation and Cling," JIB 80:68-80 (1974); Aubert et al., "Aqueous Foams," *Scientific American* 254:74-82 (1986); Roberts, R. T., "Colloidal Aspects of Beer Foam," Brewers Digest 52:50-58 (1977); Slack, P. T. and Bamforth, C. W., The Fractionation of Polypeptides from Barley and Beer by Hydrophobic Interaction Chromatography; The Influence of Their Hydrophobicity on Foam Stability," JIB 89:397-401 (1983). Of these, Roberts, supra, has suggested that the proteinaceous material in beer is the major foaming agent.

Asano and Hashimoto, Isolation and Characterization of Foaming Proteins in Beer," ASBC Journal 38:129-136 (1980) reported the presence in beer of "foaming proteins" responsible for foaming in beer. These protein were found to consist of three fractions having molecular weights in the range of 15,000 to 1,000,000 Daltons.

Bamforth and Cope, "Original Approaches to Improving the Foam of Beer," *Proc. EBC Congress*, 515-522 (1985), suggested the addition of polypeptides to beer to ensure the presence of an adequate level of proteins in beer, either by extracting foam promoters from raw materials and restoring them to the finished beer, or by using existing commercial sources of protein, such as egg white, gluten, and soya. However, the authors had little success in extracting the foam promoters from some of the raw materials investigated, including barley, and thus focused upon extraction of hydrolyzed albumen from egg whites as a suitable source of foam protein.

With respect to the iso-alpha acids generally, Asano and Hashimoto, "Contribution of Hop Bitter Substances to Head Formation of Beer," *Rep. Res. Lab. Kirin Brewery. Co., Ltd,* 19:9-16 (1976) reported that isohumulone can interact with positively charged amino groups of polypeptides in beer during foaming to provide a more stable foam. A similar interaction between melanoidin and beer polypeptides has been suggested by Jackson and Wainwright, "Melanoidins and Beer Foam," Proceedings, *ASBC* 36:192 (1978).

Recently, Baker, "Impact of Post-Filtration Addition of Selected Hop Extracts on Beer Foam and Clarity," *MBAA Tech. Quart,* 27:33-38 (1990) found that beers treated with either an iso-alpha acid (IAA) or a reduced iso-alpha acid (RIAA) showed no significant increase in foam collapse times beyond addition of 10 mg of Bitterness Units/L of finished beer of IAA or addition of 15 mg/L of RIAA, respectively. Foam collapse times of beers treated with other reduced isohumulone extracts such as tetrahydro iso-alpha acid (THIAA), hexahydro iso-alpha acid (HHIAA) or a combination of IAA/HHIAA increased significantly with each incremental addition of the extracts. However, foam cling showed no significant improvement beyond 5 mg/L of IAA, THIAA, HHIAA, or a 65/35 volumetric blend of IAA/HHIAA, or 10 mg/L of RIAA. In addition, the turbidity of each treated beer increased as the level of extract was increased, and the clarities were generally acceptable at additional rates up to 10 mg/L for each extract.

SUMMARY OF THE INVENTION

Briefly stated, the present invention is a method and composition for enhancing the foam properties of a fermented malt beverage. The method comprises adding to the beverage an isohumulone extract in the amount of between about 0.1 ppm and about 20 ppm by weight of the beverage. The method further comprises adding to the beverage foaming proteins in the amount of between about 2 ppm and about 250 ppm by weight of the beverage. The isohumulone extract and the foaming proteins may be added in-line after final filtration, either simultaneously, successively, or by a single injection of two pre-blended components.

The fermented malt beverage foam-enhancing composition comprises an isohumulone extract and foaming proteins. In particular, the composition comprises an isohumulone extract and foaming proteins; wherein the ratio of isohumulone extract to foaming proteins is between about 1 to about 1 and about 1 to about 2500.

Further disclosed is a beverage composition with enhanced foam properties which comprises (a) a fermented malt beverage; (b) an isohumulone extract, the extract comprising between about 0.1 ppm to about 20 ppm by weight of the fermented malt beverage; and (c) foaming proteins, the proteins comprising between about 2 ppm to about 250 ppm by weight of the fermented malt beverage.

It should be noted that the phrase "isohumulone extract" as used in this specification and appended claims is intended to have a relatively broad meaning and to refer to all isohumulone extracts, regular or reduced, which contribute to the enhancement of beer foam, whether they be derived from the hop itself or from non-hop or commercial sources. Further included within the meaning are all forms of synthetic isohumulone extracts, regular or reduced, which may be produced.

In addition, it is further noted that the phrase "foaming proteins" as used in this specification and the appended claims is intended to have a relatively broad meaning and to refer to proteins which contribute to the enhancement of beer foam, whether they be derived from the beer itself or from non-beer or commercial sources, as more fully described below.

The method and composition of the present invention is advantageous in that a way is provided of enhancing the foam properties of a fermented malt beverage. In particular, the present invention provides for the use of ingredients found naturally in beer to achieve a remarkable improvement in the foam characteristics of the beer, especially with regard to the beer's Cling, Collapse Rate, and Sigma Foam Value. Moreover, these enhanced qualities are preferably obtained with only an insignificant increase in undesirable chill-haze formation upon pasteurization.

These and other advantages of the present invention will be better understood upon reading the following detailed description of the preferred embodiments, together with the examples below.

DETAILED DESCRIPTION OF THE PREFERRED EMBODIMENTS

In the method aspect of the present invention, an isohumulone extract and foaming proteins are added to a malt beverage. Preferably, the isohumulone extract and the foaming proteins are added to the beer in the later stages of the brewing process in-line after primary filtration and before final filtration or while the beer is in the finishing tank. The components are typically not added earlier in the brewing process primarily because of the possibility of being precipitated out during the kettle boil, fermentation or maturation. When added during finishing, the deleterious effects of the brewing process are avoided. Pasteurization has not been shown to have any negative effects. These components may be added either simultaneously, successively, or by a single injection of the two pre-blended components.

The isohumulone extract used in the present invention may be a reduced isohumulone extract. In that case, the reduced isohumulone extract is preferably a hexahydro isohumulone extract. In general, the choice of whether to use a regular or reduced isohumulone extract depends upon which foaming protein solution is combined, and there is presently no general rule on which is preferred with regard to the entire class of foaming proteins. Presently, the best method to decide which isohumulone extract is preferred in combination with a given foaming protein solution is by experimentation, which experimentation is not undue. Suitable procedures for carrying out such experimentation is set forth in the Examples. Generally, isohumulone extract is obtained by isolating humulone from hop using either hexane or liquid $CO_2$ as a solvent. The humulone is then isomerized by heat distillation to convert humulone to isohumulone, an iso-alpha acid. Reduced isohumulones, which are a reduced form of iso-alpha acids or isomerized beta acids include dihydro iso-alpha acid (RHOIAA), tetra hydro iso-aipha acid (TIAA) and hexahydro iso-alpha acid (HHIAA).

The isohumulone extract may be obtained from commercial sources. Suitable isohumulone extracts are ones such as those sold by Kalsec, Inc., of Kalamazoo, Michigan under the designations "HEXALONE" and "ISOLONE." A similar product is available from the English Hop Processing Co., Ltd., Tonbridge, Kent, England, under the designation SOHOP $CO_2N$. The isohumulone extracts were available in 20% and 30% by weight liquid solutions.

The method of the present invention further comprises adding to the beverage foaming proteins. Preferably, the foaming proteins are of the naturally-occurring variety which can be isolated using known protein extraction procedures from a number of sources, and then added to the beverage, either simultaneously, successively, or by a single injection with an isohumulone extract. These naturally-occurring foaming proteins can be isolated using known protein extraction procedures from wheat gluten, malted barley, malted wheat, ale yeast, and lager yeast according to the methods and techniques set forth in Examples 4-7 below. Of these, the malted sources are most preferred.

In order to prepare the foam-enhancing composition, an isohumulone extract is combined with foaming proteins. In accordance with a preferred embodiment, the isohumulone extract and the foaming proteins are in a solution comprising water, sugars, alcohols and other constituents found naturally in beer and which inherently result from the extraction methods and techniques set forth in the Examples. More preferably, the isohumulone extract and foaming proteins are concentrated and packaged for use by brewers. Most preferably, the foam-enhancing composition is spray dried and packaged in powdered form for use by brewers.

The optimal amounts of isohumulone extract and foaming proteins to be combined were studied using a shaker (HRV) test as outlined in Example 8 below. It should be noted that this test must be separately run for a given foaming protein solution in order to determine the optimum isohumulone extract concentration to be used with each particular protein. For example, a particular foaming protein solution may contain more foaming proteins per milliliter of solution as would a polymeric amino acid solution produced according to the methods and techniques set forth in Example 2. In that instance, because there are presumably many more active sites for reaction with isohumulone extract in the first solution than in the polymeric amino acid solution, more isohumulone extract would be required to achieve an optimum level.

In performing the shaker (HRV), test (Example 8) on the various foaming proteins obtained according to the methods and techniques set forth in Examples 2-7 below, the following optimal ranges for isohumulone and reduced isohumulone extract concentrations were determined. It should be noted that while the following ranges are described in terms of combination with a particular foaming protein, the method of the present invention contemplates that the isohumulone extract and the foaming proteins may be added simultaneously, sequentially, or by a single injection of the two pre-blended components.

For the foaming protein solution derived from wheat gluten, preferably between about 0.1 ppm and about 20 ppm by weight of the beverage of isohumulone extract is combined with the protein solution prepared according to the methods and techniques set forth in Example 4. More preferably, the amount of isohumulone extract combined is between about 2.8 ppm and about 8.5 ppm of the beverage.

For the foaming protein solution derived from ale or lager yeast, preferably between about 0.1 ppm and about 20 ppm by weight of the beverage of isohumulone extract is combined with the protein solution prepared according to the methods and techniques set forth in Example 5. More preferably, the amount of isohumulone extract combined is between about 3.3 ppm and about 16.9 ppm of the beverage.

For the foaming protein solution derived from malted barley, preferably between about 0.1 ppm and about 20 ppm by weight of the beverage of isohumulone extract is combined with the protein solution prepared according to the methods and techniques set forth in Example 6. More preferably, the amount of isohumulone extract combined is between about 0.85 ppm and about 10.5 ppm of the beverage.

For the foaming protein solution derived from malted wheat, preferably between about 0.1 ppm and about 20 ppm by weight of the beverage of isohumulone extract is combined with the protein solution prepared according to the methods and techniques set forth in Example 7. More preferably, the amount of isohumulone extract combined is between about 0.25 ppm and about 5.10 ppm of the beverage.

It should be noted that for each of the above foaming proteins, the amount of isohumulone extract to be added is the same regardless of whether the extract is regular or reduced.

In addition, certain prepared polymeric amino acids can be used in place of the naturally-occurring foaming proteins for addition to the beverage. As used throughout this specification and the appended claims, the phrase "polymeric amino acid" refers to a polypeptide or protein consisting entirely of an unspecified number of single, repeating amino acids units. For example, polymeric lysine consists entirely of repeating units of the amino acid lysine.

For the polymeric amino acids, preferably between about 0.1 ppm and about 20 ppm by weight of the beverage of isohumulone extract is combined with the protein solution prepared according to the methods and techniques set forth in Example 2. More preferably, the amount of isohumulone extract combined is between about 2.8 ppm and about 8.5 ppm of the beverage.

At present, because all the mechanisms by which the polymeric amino acids and the isohumulone extract interact to enhance the foam of fermented beverages are not completely understood, the best means for selecting the particular polymeric amino acid is by experimentation. In this regard, the most effective test for selecting a particular polymeric amino acid is to evaluate a selected polymeric amino acid in the presence of an isohumulone extract. The evaluation process simply involves either addition of the selected polymeric amino acid to a poor foaming beer (pouring test) or by mixture alone (shaker (HRV) test). By this method, certain polymeric amino acids are found to be more effective than others, as some are more reactive to isohumulone without significantly increasing haze in the beer. These include polymeric arginine, glutamic acid, glycine, leucine, lysine and tyrosine.

Thus, there are several polymeric amino acids which have worked well in combination with isohumulone extracts in beer, while there are also some polymeric amino acids which did not work well. At present, the selection of the specific polymeric amino acid to be used with a particular isohumulone extract is best made by experimentation, which experimentation is not undue and is clearly within the ordinary skill of one in the art.

EXAMPLES

The following examples illustrate procedures for carrying out the invention, but it will be understood that they are presented purely for purposes of illustration and not as indicating the limits of the invention.

Example 1

Test Methods

The advantages of adding an isohumulone extract and foaming proteins to a fermented malt beverage were evaluated generally by using a calculated Sigma Foam Value, Percentage of Cling, and Collapse Rate for each sample tested. The Sigma Foam Value reflects the general stability of a particular beer foam was determined in accordance with procedures set forth by the American Society of Brewing Chemists. A detailed description of these procedures can be found at *Methods of Analysis of the American Society of Brewing Chemists* (E. Kneen ed. 1976), American Society of Brewing Chemists; St. Paul, Minn.

In addition, the Percentage of Cling and Collapse Rate for beer foam was determined under the following conditions. Bottled beer was equilibrated at 20° C. and poured into a 200 ml graduated glass receptacle in such a manner so as to generate approximately 150 ml of foam in the receptacle within a few seconds. Standardized pouring conditions were achieved through the use of an acrylic bottle holder which allowed for simultaneous pouring of multiple bottles of beer at identical rates and angles. During pouring, the bottle mouths were maintained two inches above the tops of the glass receptacles. Each bottle was poured into three different glass receptacles and the volume of foam (Total Foam (ml)) in each receptacle was measured immediately. Thereafter, the time for the beer foam to collapse (Foam Collapse Time (sec)) was determined. Foam Collapse Time was recorded when a beer ring of at least 0.5 cm in diameter could be observed at the bottom of the foam. Total Foam and Foam Collapse Time were recorded for each of the three samples taken from each bottle of beer, and average values were determined. From these averages, the Collapse Rate was determined as follows:

$$\text{Collapse Rate (ml/min)} = \frac{\text{Total Foam (ml)} \times 60}{\text{Foam Collapse Time (sec)}}$$

The Collapse Rate measures the rate at which the beer foam disappears. The larger the value, the poorer the quality of the foam.

Throughout this specification, the terms "cling" and "lace" are used interchangeably and essentially refer to the foam's ability to adhere to the glass receptacle. To determine the Percentage of Cling, an estimate of residual foam was made through observation of the foam remaining on the inner surface of the glass receptacle at the end of the Foam Collapse Time. Percentage of Cling measures the stability of a beer foam. The greater the value, the more enhanced the foam stability of the beer.

In most instances, the efficacy of the isohumulone extract and the foaming proteins was evaluated in the following beers: CLASS I—"STROH LIGHT and *CLASS II—"PABST BLUE RIBBON"* and "HAMMS." TABLE 1 sets forth general ranges for various characteristics of these beers.

TABLE 1

| Beer | Description of Test Beers | | |
|---|---|---|---|
| | Sigma Foam Value (Σ) | Protein (%) | Bitterness (%) |
| CLASS I | 102–110 | 0.25–0.35 | 10.0–14.0 |
| CLASS II | 85–97 | 0.20–0.30 | 9.5–11.5 |

Example 2

Polymeric Amino Acids

Example 2 was performed in order to assess the efficacy of various commercially-available polymeric amino acids as foaming proteins for combination with an isohumulone extract. As noted earlier, a polymeric amino acid is a polypeptide or protein consisting entirely of an number of a single, repeating amino acid unit. For example, polymeric lysine consists entirely of repeating units of lysine. Samples of different polymeric amino acids were obtained from Sigma Chemical Company.

To prepare polymeric amino acid stock solutions, all samples were dissolved in a 4.75% ethanol solution. Some of the less soluble (or insoluble in water) samples needed to be first dissolved in a small amount of acid or solvent are as follows:

1. Poly-L-Arginine (sulfate)—43,600 MW 50 mg dissolved in 2 ml of 6M (molar) HCl (hydrochloric acid) and volume raised to 25 ml with 4.75% ethanol solution.

2. Poly-L-Arginine (hydrochloride)—11,600 MW 50 mg dissolved in 25 ml of 4.75% ethanol solution.

3. Poly-L-Lysine (hydrobromide)—43,700 MW 100 mg dissolved in 50 ml of 4.75% ethanol solution.

4. Poly-L-Methionine—36,000 MW 50 mg dissolved in 1.0 ml of chloroform and volume raised to 25 ml with 4.75% ethanol solution.

5. Poly-D-Tyrosine—66,700 MW 100 mg dissolved in 50 ml of 4.75% ethanol solution.

6. Poly-L-Alanine—20,000 MW 50 mg dissolved in 1 ml of DCA (dichloroacetic acid) and volume raised to 25 ml with 4.75% ethanol solution.

7. Poly Glycine—15,600 MW 50 mg dissolved in 50 ml of 4.75% ethanol solution.

8. Poly-L-Glutamic acid (sodium salt)—50,740 MW 50 mg dissolved in 25 ml of 4.75% ethanol solution.

9. Poly-L-Aspartic acid (sodium salt)—42,500 MW 50 mg dissolved in 25 ml of 4.75% ethanol solution.

10. Poly-L-Leucine—21,700 MW 10 mg dissolved in 1 ml of TFA (trifluoro acetic acid) and volume raised to 25 ml with 4.75% ethanol solution.

11. Poly-L-Leucine—80,000 MW 10 mg dissolved in 0.5 ml of TFA (trifluoro acetic acid) and volume raised to 25 ml with 4.75% ethanol solution.

The final concentrations of the stock solutions were in the range of 1600 to 2000 ppm of polymeric amino acid per ml of stock solution. These polymeric amino acid concentrations were determined to avoid significant increases in turbidity. All of the polymeric amino acid solutions were adjusted to a pH of 4.2 using sodium hydroxide, and one ml of each stock solution was injected into a 12 ounce bottled beer previously chilled at 32° F. for 24 hours.

To prepare mixed stock solutions, each polymeric amino acid stock solution was mixed with an isohumulone (marked "I-[amino acid]") or a reduced isohumulone (marked "[amino acid]+"). The concentration of isohumulone or reduced isohumulone extract in the mixed stock solution was 2000 ppm. All of the polymeric amino acid solutions were adjusted to a pH of 4.2 using sodium hydroxide, and one ml of the mixed stock solution was injected into a 12 ounce bottled beer previously chilled at 32° F. for 24 hours. All treated beers were equilibrated at room temperature for one day before determining Sigma Foam Value, Percent Cling and Collapse Rate.

Under the above-described conditions, not all polymeric amino acids were found to combine with isohumulone or reduced isohumulone extract to enhance foam stability. However, the foam stability of a Class I beer did improve with the addition of combined mixtures of isohumulone or reduced isohumulone extract and a polymeric amino acid chosen from the following group: arginine, glycine, glutamic acid, leucine and tyrosine. TABLE 2 below summarizes the effect on the foam properties of a Class I beer through the addition of these foam positive polymeric amino acids in combination with an isohumulone or reduced isohumulone extract.

TABLE 2

Polymeric Amino Acids Showing Favorable Results - Class I Beer

| POLYMERIC AMINO ACIDS | MW (Daltons) | DOSE (mg/12 oz) | CLING % | COLLAP. RATE (ml/min) | SIGMA FOAM VALUE |
|---|---|---|---|---|---|
| Control | | | 18 | 50 | 91 |
| Isohumulone | | 2.0 | 39 | 44 | 103 |
| Red. Isohum. | | 2.0 | 45 | 47 | 101 |
| Arginine | 11,600 | 1.61 | 32 | 47 | 80 |
| l-Arg. | | | 45 | 42 | 132 |
| Arg. + | | | 80 | 44 | 105 |
| Glutamic Acid | 50,740 | 1.68 | 27 | 37 | 91 |
| l-Glu. | | | 55 | 43 | 92 |
| Glu. + | | | 70 | 49 | 111 |
| Glycine | 15,600 | 2.0 | 37 | 41 | 107 |
| l-Gly. | | | 57 | 40 | 125 |
| Gly. + | | | 67 | 44 | 113 |
| Leucine | 21,700 | 1.94 | 40 | 44 | 84 |
| l-Leu. | | | 48 | 36 | 112 |
| Leu. + | | | 80 | 41 | 75 |
| Tyrosine | 66,700 | 1.93 | 65 | 45 | 83 |
| l-Tyr. | | | 50 | 42 | 102 |
| Tyr. + | | | 80 | 45 | 86 | l- = A mix of isohumulone and a polymeric amino acid.
+ = A mix of reduced isohumulone and a polymeric amino acid.

On the other hand, several polymeric amino acids demonstrated less favorable results when tested in a Class I beer. These polymeric amino acids are listed below in TABLE 3.

TABLE 3

Polymeric Amino Acids Showing Less Favorable Results - Class I Beer

| POLYMERIC AMINO ACIDS | MW (Daltons) | DOSE (mg/12 oz) | CLING (%) | COLLAP. RATE (ml/min) | SIGMA FOAM VALUE |
|---|---|---|---|---|---|
| Alanine | 20,000 | 1.95 | | | |
| l-Alanine | | | 40 | 36 | 111 |
| Alanine + | | | 35 | 43 | 88 |
| Aspartic Acid | 42,500 | 1.67 | | | |
| l-Aspartic Acid | | | 45 | 39 | 104 |
| Aspartic Acid + | | | 48 | 40 | 92 |
| Lysine | 43,700 | 1.90 | | | |
| l-Lysine | | | 27 | 39 | 100 |
| Lysine + | | | 47 | 44 | 97 |
| Methionine | 36,000 | 1.98 | | | |
| l-Methionine | | | 60 | 43 | 97 |
| Methionine + | | | 30 | 47 | 107 |

The polymeric amino acids were similarly tested in a Class II beer. TABLE 4 below summarizes the effect on the foam properties of a Class II beer through the addition of foam positive polymeric amino acids in combination with an isohumulone or reduced isohumulone extract.

TABLE 4

Polymeric Amino Acids Showing Favorable Results - Class II Beer

| POLYMERIC AMINO ACIDS | MW (Daltons) | DOSE (mg/12 oz) | CLING % | COLLAP. RATE (ml/min) |
|---|---|---|---|---|
| Control | | | 7 | 67 |
| Isohumulone | | 2.0 | 27 | 62 |
| Red. Isohum. | | 2.0 | 13 | 59 |
| Arginine | 43,600 | 1.57 | 7 | 55 |
| l-Arg. | | | 30 | 48 |
| Arg + | | | 45 | 57 |
| Glutamic Acid | 50,740 | 1.68 | 3 | 54 |
| l-Glu. | | | 5 | 33 |
| Glu. + | | | 28 | 51 |
| Glycine | 15,600 | 2.0 | 6 | 57 |
| l-Gly. | | | 25 | 41 |
| Gly. + | | | 45 | 48 |
| Leucine | 80,000 | 1.94 | 4 | 62 |
| l-Leu. | | | 10 | 47 |
| Leu. + | | | 45 | 56 |
| Lysine | 43,700 | 1.90 | 2 | 60 |
| l-Lys. | | | 43 | 56 |
| Lys. + | | | 58 | 61 | l- = A mix of isohumulone and polymeric amino acids.
+ = A mix of reduced isohumulone and polymeric amino acid.

As in the case with the Class I beer, several polymeric amino acids similarly demonstrated less favorable results when tested in a Class II beer. These polymeric amino acids are listed below in TABLE 5.

TABLE 5

Polymeric Amino Acids Showing Less Favorable Results - Class II Beer

| POLYMERIC AMINO ACIDS | MW (Daltons) | DOSE (mg/12 oz) | CLING (%) | COLLAP. RATE (ml/min) |
|---|---|---|---|---|
| Alanine | 20,000 | 1.95 | | |
| l-Alanine | | | 13 | 58 |
| Alanine + | | | 17 | 50 |
| Aspartic Acid | 42,500 | 1.67 | | |
| l-Aspartic Acid | | | 7 | 48 |
| Aspartic Acid + | | | 38 | 54 |
| Methionine | 36,000 | 198 | | |
| l-Methionine | | | 4 | 69 |
| Methionine + | | | 17 | 62 |
| Tyrosine | 66,700 | 1.93 | | |
| l-Tyrosine | | | 1 | 63 |
| Tyrosine + | | | 23 | 60 |

Surprisingly, polymeric tyrosine, in combination with regular and reduced isohumulone extract, was not found to improve the foam stability of a Class II beer significantly. On the other hand, polymeric lysine, which was not a very active foam stabilizer for a Class I beer was found to show great improvement for cling in a Class II beer after mixing with regular or reduced isohumulone extract.

These results show that Sigma Foam Values were not uniformly improved by all polymeric amino acids tested. However, significant increases in Sigma Foam Values resulted from addition of an isohumulone extract in combination with arginine, glycine or leucine in a Class I beer. On the other hand, only a reduced isohumulone extract in combination with arginine, glycine or glutamic acid increased the Sigma Foam Values for a Class I beer.

Example 3

Study of Role of Molecular Weight on Efficacy of Polymeric Amino Acids

Example 3 was performed in order to assess the role of molecular weight on a polymeric amino acid's capacity, in combination with an isohumulone extract, to enhance beer foam. In this regard, various sizes of polymeric arginine and leucine were tested alone and in combination with the reduced isohumulone extract, "HEXAINE," in both a Class I and Class II beer. The results are summarized in TABLES 6 and 7 below.

TABLE 6

Variability of Molecular Weight of Polymeric Amino Acids and Their Effects of Beer Foaming Properties in a Class I Beer

| POLYMERIC AMINO ACIDS | MW (Daltons) | SIGMA FOAM VALUE | COLLAP. RATE (ml/min) | CLING (%) | TURBIDITY (FTU) |
|---|---|---|---|---|---|
| Arginine | 11,600 | 80 | 41 | 32 | 150 |
| Arginine | 43,600 | 94 | 47 | 63 | 110 |
| Arginine | 100,000 | 97 | 44 | 38 | 170 |
| Arginine + | 11,600 | 105 | 44 | 80 | 111 |
| Arginine + | 43,600 | 94 | 51 | 75 | 147 |
| Arginine + | 100,000 | 101 | 40 | 20 | 120 |
| Leucine | 21,700 | 84 | 44 | 40 | 125 |
| Leucine | 80,000 | 103 | 44 | 57 | 115 |
| Leucine + | 21,700 | 75 | 41 | 80 | 123 |
| Leucine + | 80,000 | 82 | 41 | 48 | 158 |

+ = with the addition of "HEXALONE."

TABLE 7

Variability of Molecular Weight of Polymeric Amino Acids and Their Effects of Beer Foaming Properties in a Class II Beer

| POLYMERIC AMINO ACIDS | MW (Daltons) | COLLAP. RATE (ml/min) | CLING % |
|---|---|---|---|
| Arginine | 11,600 | 44 | 17 |
| Arginine | 43,600 | 55 | 7 |
| Arginine + | 11,600 | 58 | 20 |
| Arginine + | 43,600 | 57 | 45 |
| Leucine | 21,700 | 63 | 5 |
| Leucine | 80,000 | 63 | 4 |
| Leucine + | 21,700 | 50 | 5 |
| Leucine + | 80,000 | 57 | 45 |

+ = with the addition of "HEXALONE."

At present, the data in TABLES 6 and 7 do not appear to establish a general pattern regarding efficacy when the molecular weight of the polymeric amino acids are changed, at least with respect to polymeric arginine or leucine. While a given polymeric amino acid may have an optimal molecular weight for enhancing and stabilizing the foam for a Class I beer, that same polymeric amino acid may have a different optimal molecular weight for use in a Class II beer. Similarly, the efficacy based on molecular weight may also vary depending on the presence of an isohumulone extract. Accordingly, because the above date suggests that each particular polymeric amino acid may have an optimal molecular weight for a given beer, it is suggested that each particular beer be tested separately to determine the optimal molecular weight for a given polymeric amino acid. Such experimentation is not undue and can be readily performed by one skilled in the art according to the procedures set forth in Example 8.

Example 4

Preparation of Wheat Gluten Foaming Protein

Example 4 was performed in order to test wheat gluten as a source of foaming proteins for combination with an isohumulone extract. A wheat gluten was partially hydrolyzed using papain, a proteolytic enzyme, as follows:

Step 1: 200 g of gluten was mixed thoroughly with 220 g of enzyme, and the mixture was allowed to digest at room temperature for three hours.

Step 2: 200 g of water was added and mixed. The mixture was allowed to digest further for one hour.

Step 3: The solution was diluted three-fold with water and filtered.

Step 4: The pH of the filtrate was adjusted to 3.0 with phosphoric acid.

Step 5: The filtrate was boiled for one minute (pasteurization).

Step 6: 0.15% Sodium Benzoate (a preservative) was added.

Step 7: The final mixture was concentrated.

The hydrolyzed protein solution was adjusted to pH 4.2 from its original pH of about 2.2 and kept at 0° C. for 24 hours to allow for precipitation of proteins having an isoelectric point at pH 4.2. In order to remove haze-causing particles, the precipitated protein was removed by filtration through a 0.45 membrane. Accordingly, the protein molecules that could cause haze in beer were significantly reduced. The treated gluten stock solution, with its remaining protein, was then adjusted to pH 8.5 and coded as "Gluten Foamer." The molecular weight of this Gluten Foamer was determined to be approximately 15,000 Daltons. The concentration of wheat gluten protein in the stock solution was approximately 4300 ppm.

To prepare a new beer foam composition, a portion of the Gluten Foamer was mixed with isohumulone or hexahydro isohumulone extract to form a salt complex. The amount of regular or reduced isohumulone extract in the stock solution was now 2000 ppm.

To test the efficiency of the Gluten Foamer, both alone and in combination with an isohumulone or a reduced isohumulone extract, one milliliter of the test sample was injected into a 12 ounce bottled beer previously chilled at 32° F. for 24 hours. Accordingly, the amount of wheat gluten protein in the beer was approximately 12.0 ppm, and the concentration of isohumulone or reduced isohumulone extract in the beer was 5.6 ppm. After injection, the beer was immediately re-crowned (i.e., bottle cap was replaced). A similar injection of one ml of 4.75% ethanol into a 12 ounce bottled beer was performed as a control.

The test results are shown in TABLES 8 and 9 below. TABLE 8 tabulates the results regarding the effect of Gluten Foamer on foam properties of a Class I beer.

TABLE 8

GLUTEN FOAMER - CLASS I BEER

| FOAM STABILIZER | CLING (%) | COLLAP. RATE (ml/min) | SIGMA FOAM VALUE |
|---|---|---|---|
| Control | 28 | 53 | 96 |
| Isohumulone | 43 | 46 | 105 |
| Red. Isohum. | 43 | 47 | 104 |
| Gluten Foamer | 31 | 54 | 100 |
| I-Glut. Foamer | 73 | 43 | 110 |

TABLE 8-continued

| GLUTEN FOAMER - CLASS I BEER | | | |
|---|---|---|---|
| FOAM STABILIZER | CLING (%) | COLLAP. RATE (ml/min) | SIGMA FOAM VALUE |
| Glut. Foamer + | 75 | 44 | 116 | l- = A mix of isohumulone and Gluten Foamer.
+ = A mix of Gluten Foamer and reduced isohumulone.

Similarly, TABLE 9 tabulates the results regarding the effect of Gluten Foamer on foam properties of a Class II beer.

TABLE 9

| GLUTEN FOAMER - CLASS II BEER | | | |
|---|---|---|---|
| FOAM STABILIZER | CLING (%) | COLLAP. RATE (ml/min) | SIGMA FOAM VALUE |
| Control | 11 | 80 | 91 |
| Isohumulone | 27 | 62 | 100 |
| Red. Isohum. | 18 | 59 | 95 |
| Gluten Foamer | 14 | 65 | 100 |
| l-Glut. Foamer | 63 | 41 | 110 |
| Glut. Foamer + | 30 | 47 | 103 | l- = A mix of isohumulone and Gluten Foamer.
+ = A mix of Gluten Foamer and reduced isohumulone.

It is clear that the addition of Gluten Foamer alone improved foam stability only slightly in both a Class I and Class II beer. However, the combination of Gluten Foamer with an isohumulone (I-Gluten Foamer) or reduced isohumulone extract (Gluten Foamer +) greatly increased Percent Cling and Sigma Foam Values. The combination of isohumulone extract and Gluten Foamer reduced the foam's Collapse Rate to 81% (43/53×100) of the control in a Class I beer, and to 51% (41/80×100) of the control in a Class II beer. The combination of hexahydro (reduced) isohumulone extract and Gluten Foamer also reduced Collapse Rates significantly.

These results clearly indicate the advantage of using the combination of Gluten Foamer with an isohumulone or reduced isohumulone extract for foam improvement.

Example 5

Preparation of Ale and Lager Yeast Foaming Proteins

Example 5 was performed in order to test yeast as a source of foaming proteins for combination with an isohumulone extract. Active dry ale and lager yeasts were used to prepare foaming protein stock solutions. Ten grams of an active dry yeast (ADY) were dispersed into 100 ml of a 4.75% ethanol solution and agitated by a magnetic stirrer for one hour at room temperature. The pH of this suspension was determined to be in the range of 6.5±0.2.

Alternatively, the pH of the suspension was adjusted to pH 2 (labeled "ADY extract 2") with hydrochloric acid, and to pH 10 (labeled "ADY extract 10") with sodium hydroxide after agitating for five minutes. Each of these suspensions was agitated for an additional 55 minutes.

After agitation, each of the above ADY suspensions was centrifuged and the yeast cells were removed. Each supernatant was adjusted to pH 4.2, mixed with 5,000 ppm of filter aid (JOHNS-MANVILLE CELITE 512, a form of diatomaceous earth) and 5,000 ppm of silica hydrogel, and kept at 0° C. for 24 hours. After cooling, each was subsequently filtered through a coarse filter to remove the filter aid and silica hydrogel in the suspension. The filtrates were then mixed with an additional 5,000 ppm of filter aid and refiltered through a 0.42μ (micron) membrane. The filtrates obtained were diluted to 100 ml with distilled water and designated as yeast extract. The molecular weights of the lager yeast extracts at pH 10 and pH 2 were estimated to be 10,300 and 10,500 respectively.

To prepare a new foam composition, one ml of a reduced isohumulone extract was added to each of the above filtrates and diluted to 100 ml with distilled water. To evaluate the foam stabilizing effect, one ml of each test sample was injected into a chilled beer and recrowned. The test beer was pre-chilled at 32° F. for 24 hours prior to use. A similar injection of one ml of 4.75% ethanol was performed as a control.

The test results for both a Class I and Class II beer are shown in TABLES 10 and 11 below. Ale yeast extracts at pH 6.5 and pH 2.0 injected in the absence of reduced isohumulone actually reduced the cling capacity of a Class I beer in comparison to the control. Sigma Foam Values for the treated beers were also reduced.

In addition, all ale and lager yeast extracts were mixed with a reduced isohumulone extract. Upon testing, the foam stability was found to be significantly improved in a Class I beer, both with regard to foam cling and Collapse Rate. TABLE 10 tabulates the results on the effect of yeast extract at various pH values on the foaming properties of a Class I beer.

TABLE 10

| YEAST EXTRACT - CLASS I BEER | | | |
|---|---|---|---|
| FOAM STABILIZER | CLING (%) | COLLAP. RATE (ml/min) | SIGMA FOAM VALUE |
| Control | 28 | 50 | 89 |
| Red. Isohum. | 43 | 47 | 103 |
| Ale, pH 6.5 | 23 | 50 | 83 |
| Ale +, pH 6.5 | 68 | 42 | 92 |
| Ale, pH 2.0 | 17 | 45 | 86 |
| Ale +, pH 2.0 | 78 | 42 | 104 |
| Ale, pH 10 | 12 | 44 | 77 |
| Ale +, pH 10 | 57 | 45 | 83 |
| Lager, pH 6.5 | 57 | 51 | 89 |
| Lager +, pH 6.5 | 73 | 44 | 91 |
| Lager, pH 2.0 | 33 | 46 | 87 |
| Lager +, pH 2.0 | 53 | 50 | 97 |
| Lager, pH 10 | 43 | 44 | 96 |
| Lager +, pH 10 | 72 | 43 | 83 |

+ = A mix of yeast extract and reduced isohumulone.

TABLE 11 tabulates the results on the effect of yeast extract at various pH values on the foaming properties of a Class II beer. The yeast extract samples obtained from an active dry ale yeast showed some degree of inhibition to foam cling in a Class II beer.

TABLE 11

| YEAST EXTRACT - CLASS I BEER | | |
|---|---|---|
| FOAM STABILIZER | CLING (%) | COLLAP. RATE (ml/min) |
| Control | 13 | 70 |
| Red. Isohum. | 18 | 51 |
| Lager, pH 6.5 | 20 | 70 |
| Lager +, pH 6.5 | 60 | 47 |
| Lager, pH 2.0 | 27 | 62 |
| Lager +, pH 2.0 | 65 | 56 |
| Lager, pH 10 | 18 | 79 |
| Lager +, pH 10 | 73 | 59 |
| Ale, pH 6.5 | 33 | 58 |
| Ale + pH 6.5 | 17 | 50 |
| Ale, pH 2.0 | 23 | 60 |

TABLE 11-continued

YEAST EXTRACT - CLASS I BEER

| FOAM STABILIZER | CLING (%) | COLLAP. RATE (ml/min) |
|---|---|---|
| Ale +, pH 2.0 | 47 | 52 |
| Ale, pH 10 | 38 | 52 |
| Ale +, pH 10 | 45 | 46 |

+ = A mix of yeast extract and reduced isohumulone.

When each yeast extract was combined with a reduced isohumulone extract, the foam stability was significantly improved. The results clearly show that the mixture of yeast extract and a reduced isohumulone extract improved foam stability.

Example 6

Preparation of Malted Barley Foaming Protein

Example 6 was performed in order to test malted barley as a source of foaming proteins for combination with an isohumulone extract. A brewery malt was milled and added to a 45° C. brewing water containing 0.08% calcium sulfate. The mash bill contained high protein 2 and 6 row malts. It should be noted that the calcium sulfate concentration was flexible and could be lowered or increased as desired. The mash was stirred at 45° C. for fifteen minutes to allow larger malt protein molecules to be hydrolyzed and form shorter amino acid chained molecules having molecular weights between 5,000 to 100,000 Daltons. Notably, this protein hydrolyzing time was shortened from the usual thirty minutes in a normal brewing process in order to reduce the production of small amino acid molecules having a molecular weight of less than 5000 Daltons.

After fifteen minutes resting time, the mash temperature was raised to 65° C. and maintained at that temperature for approximately thirty minutes to allow the malt starch to be actively hydrolyzed. Most starch molecules were hydrolyzed to sugars within this time period. The mash temperature was finally raised to 80° C. for about 5 to 10 minutes (depending on complete conversion) to destroy all malt enzymes, and the mash was transferred to a lauter tub. The mash was then filtered through the lauter tub to obtain a clear filtered mash. In order to preserve partially hydrolyzed proteins, kettle boiling was avoided. For the same reason, no hops were added.

In accordance with traditional methods, the clear filtered mash was fermented to a desired attenuation with a brewer's yeast in the presence of anti-foaming agents. Any type of food grade anti-foamer approved by the brewing industry is acceptable. The fermented mash was then centrifuged to remove suspended yeast cells and filtered through a coarse filter bed to remove small particles. The resulting non-hopped, fermented beer was chilled to 28–32° F. for 1 to 2 days. This fermented, non-hopped mash was refiltered with the aid of 400 to 800 ppm silica hydrogel and 400 ppm of filter aid (JOHNS-MANVILLE CELITE 512) to remove chill-haze causing materials.

To isolate the protein complex, the non-hopped, fermented beer was then extracted in a preset, hollow fiber cartridge using an ultrafiltration system with a molecular weight cut off limit of 30,000 Daltons. During this concentration step, a number of small molecular weight materials were removed including water, alcohol, amino acids, non-fermented sugars, and fatty acids. This ultrafiltration step extracted the beer to 10% of its original volume. This beer extract was designated as Malt Foamer I.

To test the efficiency of Malt Foamer I as a foam enhancing composition, Malt Foamer I was blended with 1.0 ppm to 18 ppm of either isohumulone (coded as I-Malt Foam) or hexahydro isohumulone extract (coded as Malt Foam+) and added to a Class II beer according to the same procedures described in Example 2 above.

As shown below in TABLE 12, isohumulone extract, reduced isohumulone extract, or Malt Foamer I alone could not improve foam stability significantly. However, the foam stabilizing effect was significantly improved if Malt Foamer I was blended with either isohumulone or reduced isohumulone extract. Notably, for those test beers treated with this new combination, a significant increase in the beer's ability to cling to the glass receptacle was demonstrated.

TABLE 12

MALT FOAMER I - CLASS II BEER

| FOAM STABILIZER | CLING (%) | COLLAP. RATE (ml/min) | SIGMA FOAM VALUE |
|---|---|---|---|
| Control | 14 | 57 | 101 |
| Isohumulone | 22 | 48 | 105 |
| Red. Isohum. | 19 | 45 | |
| Malt Foamer I | 35 | 46 | 102 |
| I-Malt Foamer I | 45 | 38 | 110 |
| Malt Foamer I+ | 63 | 39 | 110 |

I- = A mix isohumulone and Malt Foamer.
+ = A mix of Malt Foamer and reduced isohumulone.

Example 7

Preparation of a Malted Wheat Foaming Protein

Example 7 was performed in order to test malted wheat as a source of foaming proteins for combination with an isohumulone extract. A clear filtered mash was obtained according to the procedure set forth in Example 6, with the exception of the use of a 6-row malt and wheat malt (10%) combination as the original mash bill (rather than a 2-row and 6-row combination). Fermentation was carried out in bioreactor-containing, immobilized yeast cells. Fermentation proceeded rapidly and resulted in low levels of free-flowing yeast cells in the finished, non-hopped beer. Accordingly, no centrifugation was required to separate the yeast cells, and only a primary filtration was required to remove particulates before going on to the ultrafiltration step.

Ultrafiltration was accomplished using a hollow fiber cartridge having a molecular weight cut-off limit of 30,000 Daltons to separate higher molecular weight proteins from those with molecular weights less than 30,000 Daltons. These smaller proteins were removed along with unhopped beer, leaving the high molecular weight protein fraction in the ultrafiltration system. Approximately 40 to 80 ppm of tannic acid and 400 ppm of filter aid (JOHNS-MANVILLE CELITE 512) were added to the extracted, high molecular weight protein fraction for chillproofing, and the extract (designated MF3T) was kept at 28°–32° F. for 1 day before filtration. Alternatively, 400 to 800 ppm of silica hydrogel was used in place of tannic acid to chillproof the extract (designated MF3C). Both of the chillproofed, high molecular weight protein fractions were separately combined with 1.0 ppm to 18 ppm isohumulone or reduced isohumulone extract to produce alternative foam stabilizers MF3T and MF3C. The new compositions were tested on a Class II beer according to the procedures described in Example 2 above. The results are summarized in TABLE 13 below.

TABLE 13

Malt Foamers MF3T and MF3C - Class II Beer

| FOAM STABILIZER | CLING (%) | COLLAP. RATE (ml/min) | SIGMA FOAM VALUE |
|---|---|---|---|
| Control | 22 | 44 | 101 |
| Isohumulone | 45 | 38 | 105 |
| Red. Isohum. | 53 | 38 | 103 |
| Malt Foamer 3C | 18 | 41 | 103 |
| Malt Foamer 3T | 22 | 43 | 105 |
| I-Malt Foamer 3C | 70 | 37 | 105 |
| I-Malt Foamer 3T | 68 | 38 | 103 |
| Malt Foamer 3C+ | 77 | 34 | 107 |
| Malt Foamer 3T+ | 70 | 35 | 106 |

I- = A mix isohumulone and Malt Foamer 3C or 3T.
+ = A mix of Malt Foamer 3C or 3T and reduced isohumulone.

Example 8

In order to determine the optimal levels of isohumulone extract and foaming proteins to be added to a given malt beverage, shaker (HRV) tests were performed. To perform the shaker (HRV) test, a series of 50 ml graduated cylinders containing 10 ml of a particular foaming protein solution were prepared. The foaming protein solutions were obtained according to the methods and techniques set forth in Examples 2–7 above. Various increments of isohumulone or reduced isohumulone extract were then added to the cylinders. Each cylinder was stoppered, shaken vigorously for five seconds, and the foam height recorded in milliliters. After five minutes, the final foam and liquid heights were recorded. From these values, the head retention value (i.e. the difference between the final foam and liquid height, in milliliters) for each sample was determined.

TABLE 14 provides an example of data compiled using a 20% solution of reduced isohumulone extract and Malt Foamer 1 (MF1), a foaming protein derived from malt according to the methods and techniques set forth in Example 6 above.

TABLE 14

SHAKER (HRV) TEST: Hop Extract - 20% Reduced Isohumulone

| Extract Addition (ml) to 10 ml MF1 | Pure Reduced Isohumulone (g/L MF1) | Initial Foam Height (ml) | Final Foam Height (ml) | Final Liquid Height (ml) | Head Retention Value | Cling |
|---|---|---|---|---|---|---|
| 0 | 0 | 27 | 27 | 7 | 20 | Fair |
| 0.015 | 0.3 | 33 | 32 | 7 | 25 | Fair |
| 0.03 | 0.6 | 36 | 37 | 7 | 30 | Good |
| 0.06 | 1.2 | 36 | 37 | 6 | 31 | Good |
| 0.09 | 1.8 | 44 | 43 | 6 | 37 | Exc. |
| 0.12 | 2.4 | 40 | 40 | 5 | 35 | Exc. |
| 0.15 | 3.0 | 41 | 42 | 6 | 36 | Exc. |
| 0.18 | 3.6 | 42 | 42 | 5 | 37 | Exc. |

Cling Key:
0–10% = Poor, 10–30% = Fair
30–60% = Good, 60%+ = Exc.

In this example, as in most cases, the head retention value ceases to increase after an optimum level of isohumulone extract has been reached. This value is considered to be the saturation point of foaming proteins with isohumulone extract. Further addition has no effect, as a plateau is reached where additional isohumulone extract fails to react with the foaming proteins.

Thus, it can be seen from each of the foregoing examples that the addition of a single component alone of either isohumulone extract, reduced isohumulone extract, or a partially hydrolyzed protein is ineffective above certain concentrations. However, a combination of either isohumulone or reduced isohumulone extract, together with a partially hydrolyzed protein solution, enhances foam stability without undesirable side effects such as increased turbidity or haze formation. In order to achieve these positive benefits, the components are added in the later stages of the brewing process, usually after filtration or during finishing.

We claim:

1. A method of making a fermented malt beverage with enhanced foam properties comprising the steps of:
    obtaining malt beverage ingredients;
    processing said malt beverage ingredients to make a fermented malt beverage;
    obtaining an isohumulone extract in a process independent of the malt beverage making process;
    adding said isohumulone extract in an amount of between about 0.1 ppm and about 20 ppm by weight of the beverage;
    obtaining foaming proteins in a process independent of the malt beverage making process; and
    adding said foaming proteins in an amount of between about 2 ppm and about 250 ppm by weight of the beverage.

2. The method according to claim 1 wherein the isohumulone extract and foaming proteins are added after maturation of the malt beverage.

3. The method according to claim 1 wherein the isohumulone extract comprises non-reduced isohumulone.

4. The method according to claim 1 wherein the isohumulone extract comprises reduced isohumulone.

5. The method according to claim 1 wherein the isohumulone extract comprises hexahydro isohumulone.

6. The method according to claim 1 wherein the foaming proteins are polymeric amino acids.

7. The method according to claim 6 wherein the polymeric amino acids are selected from the group consisting of polymeric arginine, glutamic acid, glycine, leucine, lysine and tyrosine.

8. The method according to claim 1 wherein the foaming proteins are derived from a source selected from the group consisting of wheat gluten, malted barley, malted wheat, ale yeast, and lager yeast.

9. The method according to claim 1 wherein the foaming proteins have a molecular weight in the range of about 10,300 to about 100,000 Daltons.

10. The method according to claim 1 wherein isohumulone extract in an amount of between about 0.8 ppm and about 17 ppm by weight of the beverage and foaming proteins in an amount of between about 4 ppm and about 100 ppm by weight of the beverage are added.

11. The method according to claim 1 wherein about 12 ppm of foaming proteins derived from wheat gluten and having a molecular weight of about 15,000 Daltons and about 5.6 ppm of hexahydro isohumulone extract are added.

12. A fermented malt beverage foam-enhancing composition for adding to a quantity of malt beverage ingredients comprising isohumulone extract and foaming proteins, wherein the foaming proteins are selected from the group consisting of isolated, naturally-occurring foaming proteins and amino acids, and wherein the ratio of is0humulone extract to foaming proteins is between about 1 to about 1 and about 1 to about 2500.

13. The composition according to claim 12 wherein the isohumulone extract comprises non-reduced isohumulone.

14. The composition according to claim 12 wherein the isohumulone extract comprises reduced isohumulone.

15. The composition according to claim 12 wherein the isohumulone extract comprises hexahydro isohumulone.

16. The composition according to claim 12 wherein the foaming proteins are polymeric amino acids.

17. The composition according to claim 16 wherein the polymeric amino acids are selected from the group consisting of polymeric arginine, glutamic acid, glycine, leucine, lysine and tyrosine.

18. The composition according to claim 12 wherein the foaming proteins are derived from a source selected from the group consisting of wheat gluten, malted barley, malted wheat, ale yeast, and lager yeast.

19. The composition according to claim 12 wherein the foaming proteins have a molecular weight in the range of about 10,300 to about 100,000 Daltons.

20. The composition according to claim 12 wherein the ratio of isohumulone extract to foaming proteins is between about 1 to about 10 and about 1 to about 250.

21. The composition according to claim 12 wherein the isohumulone extract comprises hexahydro isohumulone extract, the foaming proteins are derived from wheat gluten and have a molecular weight of about 15,000 Daltons, and wherein the weight ratio of said hexahydro isohumulone extract to said foaming proteins is about 1 to about 2.15.

22. A method of enhancing the foam properties of a fermented malt beverage comprising adding to the beverage:
an isohumulone extract in an amount of between about 0.1 ppm and about 20 ppm by weight of the beverage; and
polymeric amino acids in an amount of between about 2 ppm and about 250 ppm by weight of the beverage.

23. The method of claim 22 wherein the isohumulone extract is added in an amount of between about 0.8 ppm and about 17 ppm by weight of the beverage and the polymeric amino acids are added in an amount of between about 4 ppm and about 100 ppm by weight of the beverage.

24. The method according to claim 22 wherein the polymeric amino acids are selected from the group consisting of polymeric arginine, glutamic acid, glycine, leucine, lysine and tyrosine.

25. The method according to claim 22 wherein the polymeric amino acids have a molecular weight in the range of about 10,300 to about 100,000 Daltons.

26. A fermented malt beverage foam-enhancing composition comprising an isohumulone extract and polymeric amino acids, wherein the ratio of isohumulone extract to polymeric amino acids is between about 1 to 1 and about 1 to 2500.

27. The composition according to claim 26 wherein the ratio of isohumulone extract to polymeric amino acids is between about 1 to 10 and about 1 to 250.

28. The composition according to claim 26 wherein the polymeric amino acids are selected from the group consisting of polymeric arginine, glutamic acid, glycine, leucine, lysine and tyrosine.

29. The composition according to claim 26 wherein the polymeric amino acids have a molecular weight in the range of about 10,300 to about 100,000 Daltons.

30. A beverage composition with enhanced foam properties comprising:
(a) a fermented malt beverage;
(b) an isohumulone extract, the extract comprising between about 0.1 ppm and about 20 ppm by weight of the fermented malt beverage; and
(c) polymeric amino acids, the polymeric amino acids comprising between about 2 ppm and about 250 ppm by weight of the fermented malt beverage.

31. The composition according to claim 30 wherein the polymeric amino acids are selected from the group consisting of polymeric arginine, glutamic acid, glycine, leucine, lysine and tyrosine.

32. The composition according to claim 30 wherein the polymeric amino acids have a molecular weight in the range of about 10,300 to about 100,000 Daltons.

33. A method of enhancing the foam properties of a fermented malt beverage comprising adding an isohumulone extract in an amount of between about 0.1 ppm and about 20 ppm by weight of the beverage and foaming proteins in an amount of between about 2 ppm and about 250 ppm by weight of the beverage, wherein the foaming proteins are selected from the group consisting of isolated, naturally-occurring foaming proteins and polymeric amino acids.

34. A beverage composition with enhanced foam properties comprising:
(a) a fermented malt beverage;
(b) an isohumulone extract, the extract comprising between about 0.1 ppm
and about 20 ppm by weight of the fermented malt beverage; and
(c) foaming proteins, the foaming proteins comprising between about 2 ppm and about 250 ppm by weight of the fermented malt beverage,
wherein the foaming proteins are selected from the group consisting of isolated, naturally-occurring foaming proteins and polymeric amino acids.

35. The composition according to claim 34 wherein the isohumulone extract comprises non-reduced isohumulone.

36. The composition according to claim 34 wherein the isohumulone extract comprises reduced isohumulone.

37. The composition according to claim 34 wherein the isohumulone extract comprises hexahydro isohumulone.

38. The composition according to claim 34 wherein the foaming proteins are polymeric amino acids.

39. The composition according to claim 38 wherein the polymeric amino acids are selected from the group consisting of polymeric arginine, glutamic acid, glycine, leucine, lysine and tyrosine.

40. The composition according to claim 34 wherein the foaming proteins are selected from the group consisting of wheat gluten, malted wheat, malted barley, ale yeast, and lager yeast.

41. The beverage composition according to claim 34 wherein the isohumulone extract comprises about 5.6 ppm by weight of the beverage and the foaming proteins comprise about 12 ppm by weight of the beverage, the foaming proteins being derived from wheat gluten and having a molecular weight of about 15,000 Daltons.

* * * * *